(12) United States Patent
Larwood

(10) Patent No.: US 7,730,664 B2
(45) Date of Patent: Jun. 8, 2010

(54) PLANT CONTAINER

(76) Inventor: Alan John Larwood, Dalwood Limited, 7 Lincoln Close, Bembridge, Isle of Wight, PO35 5RP (GB)

( * ) Notice: Subject to any disclaimer, the term of this patent is extended or adjusted under 35 U.S.C. 154(b) by 242 days.

(21) Appl. No.: 11/710,310

(22) Filed: Feb. 23, 2007

(65) Prior Publication Data
US 2007/0214717 A1 Sep. 20, 2007

(30) Foreign Application Priority Data
Feb. 23, 2006 (GB) .................................. 0603613.1

(51) Int. Cl.
*A01G 9/02* (2006.01)
(52) U.S. Cl. .................. 47/66.1; 47/67; 47/83
(58) Field of Classification Search ............. 47/66.1, 47/66.5, 81, 79, 65, 65.9, 66.7, 67, 41.11, 47/83, 82, 66.6, 66.2; 220/4.26, 4.01, 4.06, 220/4.07, 676; 206/501, 503, 505, 423, 506, 206/514, 515; *A01G 9/02*
See application file for complete search history.

(56) References Cited

U.S. PATENT DOCUMENTS

| | | | |
|---|---|---|---|
| 3,990,179 A | 11/1976 | Johnson et al. | |
| 4,534,474 A * | 8/1985 | Ng | 211/70 |
| D313,203 S * | 12/1990 | Carlson | D11/153 |
| 5,103,587 A * | 4/1992 | Holler | 47/75 |
| 5,282,335 A * | 2/1994 | Holtkamp, Jr. | 47/81 |
| 5,339,974 A * | 8/1994 | Raghunathan | 220/4.26 |
| 5,727,347 A * | 3/1998 | Sellers | 47/67 |
| 5,930,951 A | 8/1999 | Wong | |
| 6,381,900 B1 | 5/2002 | Crowley | |
| 6,612,073 B1 * | 9/2003 | Powell et al. | 47/83 |
| D493,384 S * | 7/2004 | Jensen | D11/143 |
| 2003/0155317 A1 * | 8/2003 | McNeeley et al. | 211/78 |
| 2006/0112634 A1 * | 6/2006 | Vogt | 47/81 |
| 2006/0179716 A1 * | 8/2006 | Maniscalco et al. | 47/81 |
| 2007/0186469 A1 * | 8/2007 | Keats | 47/83 |

FOREIGN PATENT DOCUMENTS

| | | | |
|---|---|---|---|
| GB | 2 280 344 A | | 2/1995 |
| GB | 2406255 A | * | 3/2005 |

* cited by examiner

*Primary Examiner*—Son T Nguyen
*Assistant Examiner*—Shadi Baniani
(74) *Attorney, Agent, or Firm*—Frommer Lawrence & Haug LLP; Ronald R. Santucci

(57) ABSTRACT

A plant container assembly (1) comprising two detachably connectable enclosure sections (3, 4), the assembly comprising attachment means (39) which is adapted to secure the sections in the direction of the height of the container, wherein, in an assembled condition, the attachment means is located internally of the assembly.

9 Claims, 2 Drawing Sheets

PLANT CONTAINER

This application claims priority benefits of Great Britain patent application number 0603613.1 filed Feb. 23, 2006.

The present invention relates to plant containers, and in particular, although not exclusively, to plant containers of the type which are adapted to be suspended, conventionally known as hanging baskets.

Known plant containers allow plants to protrude and grow out of a side wall of such containers for enhanced aesthetic appearance. This is achieved by arranging that the root of a plant is within the container, and the stem and foliage extend out of an aperture in the container. However, the steps required to so arrange a plant risk damage to the plant.

The present invention seeks to provide an improved plant container.

According to a first aspect of the invention there is provided a plant container assembly comprising two detachably connectable enclosure sections, the assembly comprising attachment means which is adapted to secure the sections in the direction of the height of the container, wherein, in an assembled condition, the attachment means is located internally of the assembly.

Preferably the assembly comprises location means which is adapted to substantially restrict relative lateral movement of the sections.

The location means is preferably located internally of the assembly.

The attachment means preferably comprises a resilient member on one enclosure section and a support surface provided with the other enclosure section which surface is adapted to support a surface portion of the resilient member, or vice versa.

The resilient member is preferably arranged to be capable of deflection substantially laterally of the assembly.

Preferably the resilient member is resiliently biased radially inwardly of the assembly.

The resilient member preferably comprises a barbed portion which is adapted to engage with the support surface.

Most preferably the attachment means comprises retaining means which is operative to urge the resilient members into engagement with the support surface.

The retaining means preferably comprises opposing surface portions of the enclosure components. One of the opposing surface portions is desirably provided by a wall portion which in part defines an aperture, which aperture is adapted to receive the resilient member.

The location means preferably comprises a protrusion on one component and a recess on the other component, the recess being adapted to receive the protrusion.

Each of the protrusion and the recess is preferably provided towards a distal end of a respective enclosure component. Most preferably each of the protrusion and the recess is provided at an end rim of the respective enclosure component.

The assembly preferably comprises at least three enclosure sections.

At least one of the enclosure sections is provided with an aperture in a side wall thereof so as to allow a plant to extend therethrough. Preferably the aperture is open at a distal end of the enclosure section.

One embodiment of the invention will now be described, by way of example only, with reference to the accompanying drawings in which.

Figure 1:
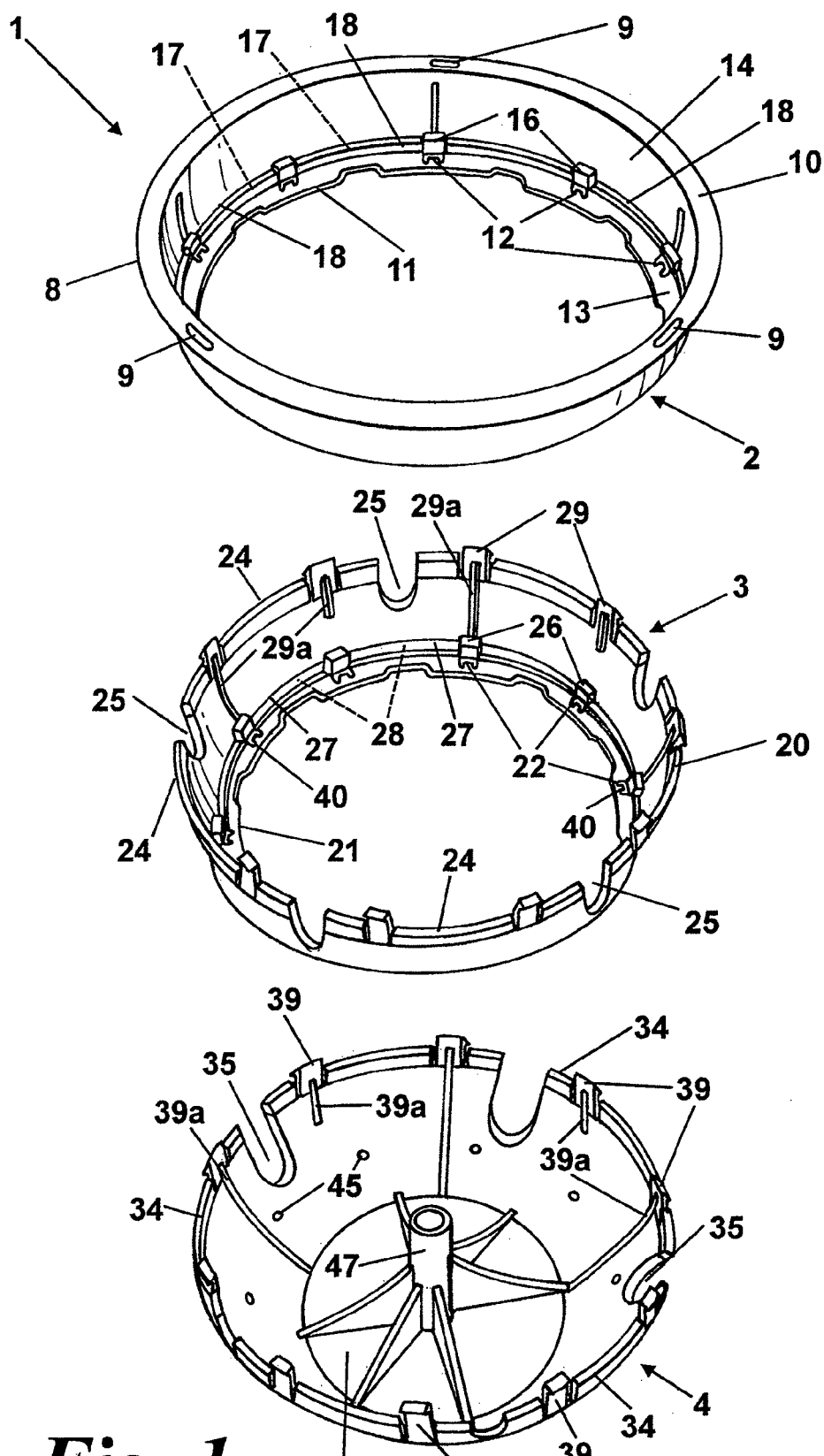
FIG. 1 is an exploded perspective view of a plant container assembly.

With reference to FIG. 1 there is shown a multi-section plant container assembly 1 comprising three enclosure sections 2, 3 and 4. Each section is adapted to be detachably connected to an adjacent section and so form an assembled plant container. As is described in more detail below the sections are arranged to be push-fit together by way of attachment means and location means so as to form an assembled plant container assembly of substantially hemispherical shape.

The enclosure section 2 forms an uppermost section of the assembly 1 and comprises an upper end 10 which provides an upper rim of the assembly. A lowermost end 11 allows the section 2 to be secured to the intermediate section 3. Specifically, the lowermost end 11 comprises a plurality of apertures 12 which are provided in an annular lip 13. Located on side wall 14 there are provided a plurality of shoulder formations 16. The shoulder formations are located adjacent to the apertures 12.

Figure 2:
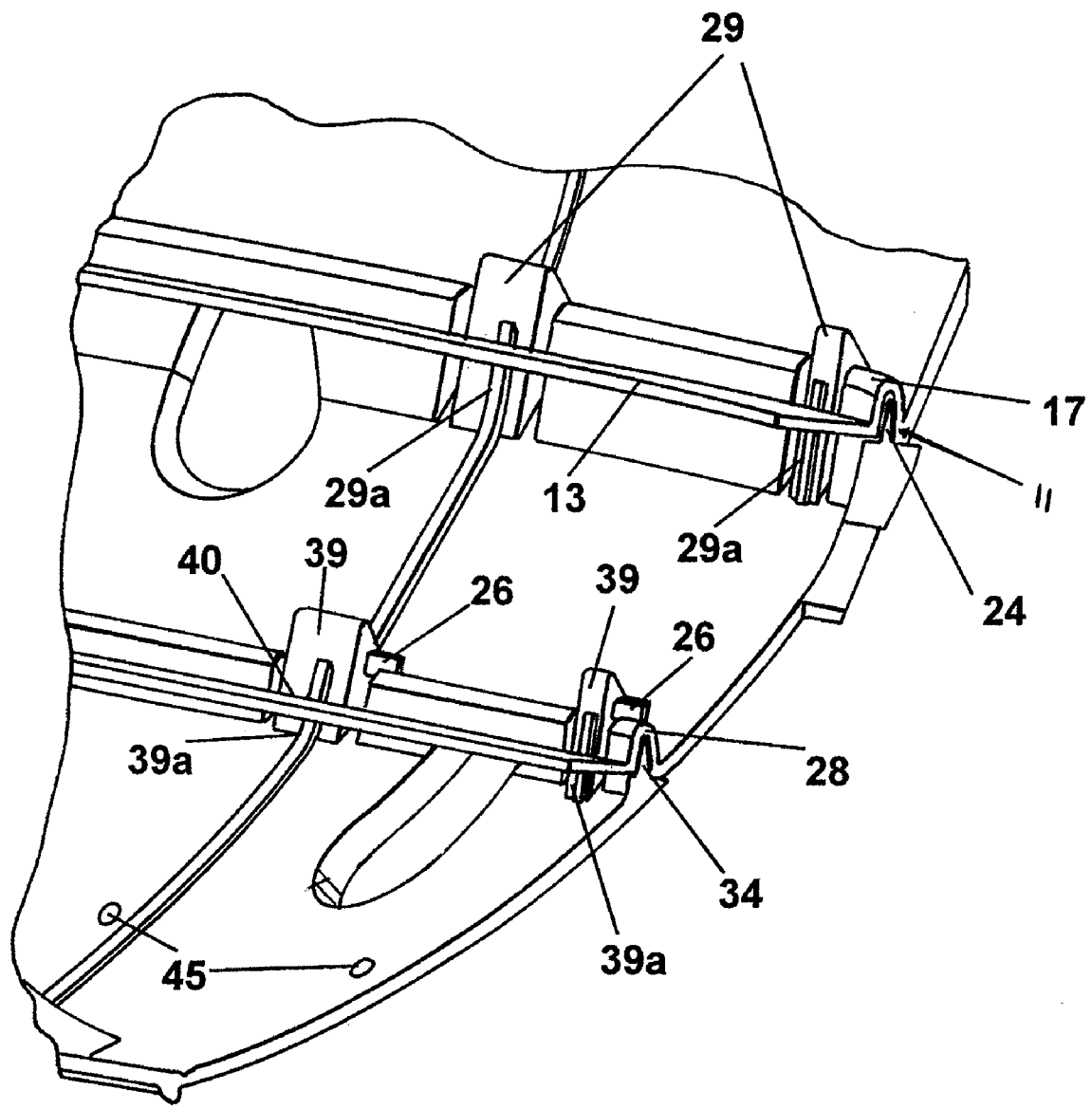
FIG. 2 is an enlarged partial perspective view of the plant container assembly of FIG. 1 in an assembled condition.

As best seen in FIG. 2 the lowermost end 11 has provided therein a plurality of circumferentially spaced arcuate channels 17. The channels 17 are formed in each of the formations 18 which are arranged around the annular lip 13, and between the shoulder formations 16.

The intermediate section 3 comprises an upper end 20 and a lower end 21. The upper end 20 comprises a plurality of resilient barb members 29. The barb members 29 are orientated slightly inwardly (ie towards the central axis of the enclosure section). An inwardly facing surface of each barb member is provided with a rib 29a.

The upper end 20 further comprises a plurality of arcuate protrusions 24 which are provided between the barb members 29.

Formed in some of the protrusions 24 recesses 25 are provided.

The lower end 21 comprises a plurality of equally-angularly spaced apertures 22, for each of which there is provided an adjacent shoulder formation 26. Formations 27 have provided therein respective arcuate channels 28. The apertures 22, the shoulder formations 26, the formations 27 and the channels 28 are substantially identical to the corresponding features of the enclosure section 2.

The section 4 forms a basal section of the assembly, which section comprises an upper end 30. The upper end 30 comprises a plurality of barb members 39 (which are substantially identical to barb members 29) and arcuate protrusions 34 (which are substantially identical to protrusions 24). An inwardly facing surface of each barb member 39 is provided with a rib 39a. The upper section 30 is further provided with apertures 35 which are of a shape similar to that of apertures 22, save that the apertures 35 are of larger size.

Although only one rib 29a or 39a is shown as being provided on each barb member, in alternative embodiments two or more such ribs may be provided on each of the barb members.

The basal section 4 further comprises an upstanding hollow tube 47. The tube 47 is adapted to receive and secure a pole member (not shown), which pole member can then be connected to a support fixture (eg a hook or bracket) so as to suspend the assembly. Alternatively two assembled container assemblies can be mounted onto a pole member in a vertically spaced-apart relationship, and the uppermost container assembly is attached to a fixture by way of a chain or the like. Alternatively such a tiered arrangement may be adapted to be a ground mounted structure. The tube 47 may be used to receive a portion of a drip tray which is located underneath the basal section so as to collect liquid falling from the assembly 1. The basal section 4 is provided with drainage apertures 45.

The enclosure sections 2, 3 and 4 connect together as follows. In order to attach the intermediate section 3 to the basal section 4, the apertures 22 are aligned with the barb members 39. In so doing the channels 28 are aligned with the protrusions 34. The intermediate section is then urged towards the basal section and in so doing the barb members 39 pass through respective apertures 22. The inward bias of each barb members causes each respective rib 29a to engage with a respective surface portion 40 which partially defines an aperture 22 and urge each barb member to flex generally laterally outwardly and towards a respective shoulder formation. Eventually a head portion of each barb member 39 is atop the respective shoulder portion 26. The barb members 39 and the shoulder formations 26 provide the attachment means, which means secures the sections together in the direction of the height of the assembly.

At the same time, the protrusions 34 are received in respective channels 28 and so provide location means, which means serves to substantially prevent relative movement of the enclosure sections in a lateral direction.

The uppermost section 2 is secured to the intermediate section 3 in an identical fashion.

In use the container assembly 1 is assembled in stages and filled with growing medium. Plants may be positioned in the container with their roots in the growing medium, their stems laid through the apertures 25 and 35 and the foliage displayed outside the container. As one layer is filled with growing medium and planted a further section of the container is push fitted onto the section beneath leaving the plants' stems undamaged in their respective apertures. This section is then filled with growing medium and plants in the same way and the top section is then fitted and filled with growing medium so that plants can be planted in the top section (in the conventional way).

Each of three chain members (not shown), or the like, are then attached to a respective aperture 9 and the chain members are then attached to a fixture so as to suspend the assembly 1.

Advantageously the assembly 1 facilitates the planting of appropriate plant seedlings or mature plants around the sides of the container so that they are not damaged in the planting process since the root of each plant is within the container and the stem and foliage protrude through the apertures. An additional feature is that valuable or seasonal plants can be recovered after the growing season by dismantling the container assembly in the reverse of the assembly process and retrieving plants to be stored for future use. Specifically, sections can be detached by manually flexing back the barbed members from their shoulder formations and then pulling the apertures back away from the respective barb members.

Since the location means and the attachment means are located internally a clean smooth join line at the interface between section enclosures is presented externally and once the container assembly is filled with growing medium and plants said means are held firmly in a securing condition position and cannot be accidentally released or tampered with. Since the barb members are internally located they are advantageously protected from direct sunlight which may cause the exposed material of the container to overheat and loose its rigidity which is an important factor in the successful attachment of enclosure sections.

A further advantage is that mature plants which have been grown on elsewhere, can be transplanted directly into the container assembly as the season dictates. The use of mature plants produces an immediate decorative effect which allows the container to be used successfully for winter, spring and autumn displays as well as the traditional summer display. It also avoids the necessity, usual with traditional planters, of having to plant up young summer seedlings in the container and keeping them protected until they have grown on.

Conversely mature perennial plants which have finished their seasonal display period but are required to be kept for future use may easily be removed without damage and stored elsewhere until needed again.

Although the drawings show a three section hemispherical arrangement, in alternative embodiments the container could be of any shape or have any number of sections each with any number of apertures. Alternative embodiments may have curved, straight or sloping sides and/or be free standing, column mounted through a central pole, wall mounted or suspended as a hanging basket, being secured either with chains fixed to its top perimeter edge or via a central pillar fixed to its base section. It is intended primarily for external use but can, with the affixing of suitable drip trays, also be used indoors.

In an alternative embodiment one or more enclosure sections may comprise two hinged or completely separable parts, which, when in an assembled condition form an assembled enclosure section which can then be attached to one or more other enclosure sections. Advantageously, such a hinged arrangement allows an enclosure section to be more easily packaged/transported/stowed in an unassembled condition.

In yet a further embodiment the basal section is provided with a perforated upstanding hollow tube which is arranged to allow liquid nutrition to be fed into an uppermost opening so that the liquid is distributed along the depth of the growing medium in the container assembly.

The invention claimed is:

1. A plant container assembly comprising two detachably connectable enclosure sections, the assembly comprising attachment elements adapted to secure open distal ends of the enclosure sections in the direction of the height of the container, wherein, in an assembled condition, the attachment elements are located internally of the assembly, wherein the attachment elements comprise a resilient member having a barbed portion on one enclosure section and a support surface and an aperture provided with the other enclosure section which surface is adapted to support the barbed portion of the resilient member, and which aperture is configured to allow the resilient member to pass therethrough, wherein the barbed portion is provided at a free end portion on one side of the member and a rib portion is provided at an opposite end portion on an opposite side of the resilient member, and in an attached condition, the rib portion engaged with a retaining surface portion which defines the aperture so as to urge and laterally deflect the barbed portion into engagement with the support surface and rims defining the open distal ends of the enclosure sections comprise location elements which comprise an arcuate channel on one rim and an arcuate protrusion on the other rim, wherein in the attached condition the protrusion is received in the channel so as to substantially restrict relative lateral movement of the sections.

2. A plant container assembly as claimed in claim 1 in which the location elements are located internally of the assembly.

3. A plant container assembly as claimed in claim 1 in which the resilient member is resiliently biased radially inwardly of the assembly.

4. A plant container assembly as claimed in claim 1 which comprises at least three enclosure sections.

5. A plant container assembly as claimed in claim 1 in which at least one of the enclosure sections is provided with an aperture in a side wall thereof so as to allow a plant to extend therethrough.

6. A plant container assembly as claimed in claim 5 in which the aperture is open at a distal end of the enclosure section.

7. A plant container as claimed in claim 1, wherein the resilient member is of a length and the rib portion extends for less than the length of the resilient member.

8. A plant container as claimed in claim 1, wherein the support surface extends from an inner surface of a sidewall of an enclosure section, and the aperture is provided in an inwardly extending annular portion.

9. A plant container as claimed in claim 1 further comprising:
- a plurality of attachment elements; and
- a plurality of location elements,
- wherein in the attached condition the attachment elements and the location elements alternate around an interface of the secured distal open ends.

* * * * *